(12) United States Patent
Kakuda et al.

(10) Patent No.: US 11,900,205 B2
(45) Date of Patent: Feb. 13, 2024

(54) GLOVE/LOGGING SYSTEM

(71) Applicant: AIREX CO., LTD., Nagoya (JP)

(72) Inventors: Daisuke Kakuda, Nagoya (JP); Jun Masudome, Nagoya (JP); Yoshiaki Okada, Nagoya (JP); Koji Kawasaki, Nagoya (JP)

(73) Assignee: AIREX CO., LTD.

( * ) Notice: Subject to any disclaimer, the term of this patent is extended or adjusted under 35 U.S.C. 154(b) by 1079 days.

(21) Appl. No.: 16/624,085

(22) PCT Filed: Jun. 11, 2018

(86) PCT No.: PCT/JP2018/022234
§ 371 (c)(1),
(2) Date: Mar. 3, 2020

(87) PCT Pub. No.: WO2019/003886
PCT Pub. Date: Jan. 3, 2019

(65) Prior Publication Data
US 2023/0229877 A1 Jul. 20, 2023

(30) Foreign Application Priority Data
Jun. 26, 2017 (JP) .................................. 2017-123879

(51) Int. Cl.
G06K 7/10 (2006.01)

(52) U.S. Cl.
CPC ..... *G06K 7/10396* (2013.01); *G06K 7/10425* (2013.01)

(58) Field of Classification Search
CPC ........... G06K 7/10366; G06K 7/10396; G06K 7/10425
(Continued)

(56) References Cited

U.S. PATENT DOCUMENTS

| 11,048,891 | B1* | 6/2021 | Linn | ................... G06K 7/10366 |
| 2008/0139865 | A1* | 6/2008 | Galliher | ................ C12M 41/14 588/249 |

(Continued)

FOREIGN PATENT DOCUMENTS

| JP | 2006043569 A | 2/2006 |
| JP | 2009225742 A | 10/2009 |

(Continued)

*Primary Examiner* — Yong Hang Jiang
(74) *Attorney, Agent, or Firm* — Quarles & Brady LLP; Yakov S. Sidorin

(57) ABSTRACT

The present invention provides a glove/logging system capable of accurately determining periods for glove airtightness inspection and replacement and improving the safety of a work glove in use and the work efficiency by recording and storing the status of use such as the operator name, the frequency of use, the period of use, and the details of work for an individual pair of work gloves attached to an equipment such as an isolator, and retroactively checking improper work and equipment abnormalities by tracing glove operations upon occurrence of operational abnormalities.

The glove/logging system is configured to record and store information on the status of use for a work glove, and include an operator tag, a glove tag, a reader for reading information from the tags, and an information device for recording and storing information. The reader is configured to receive information from the operator tag that passes through the reception region or stops therein or the glove tag via the antenna to communicate the information with the information device.

6 Claims, 10 Drawing Sheets

(58) Field of Classification Search
USPC .......................................................... 340/10.4
See application file for complete search history.

(56) References Cited

U.S. PATENT DOCUMENTS

| | | | | |
|---|---|---|---|---|
| 2011/0058986 A1* | 3/2011 | Yokoi | .................... | C12M 37/00 |
| | | | | 422/111 |
| 2018/0293873 A1* | 10/2018 | Liu | ........................ | G16H 40/20 |
| 2019/0105779 A1* | 4/2019 | Einav | ..................... | B25J 9/1689 |
| 2021/0142235 A1* | 5/2021 | Hoover | ............ | G06Q 10/06395 |

FOREIGN PATENT DOCUMENTS

| | | | | |
|---|---|---|---|---|
| JP | 5209354 B2 * | 6/2013 | ............ | C12M 47/04 |
| JP | 2015505280 A | 2/2015 | | |

\* cited by examiner

ACCUMULATED DATA IMAGE

ACCUMULATION BY EQUIPMENT/PORT

| Equip No. | Port No. | Total Time |
|---|---|---|
| 1 | 01 | 1 hr 30 min |
| 1 | 02 | 1 hr 10 min |

ACCUMULATION BY WORKER

| Worker | Port | Rt/Lt | Total Work Time |
|---|---|---|---|
| Suzuki | 01 | Right | 30 min |
| Suzuki | 02 | Left | 10 min |
| Suzuki | 01 | Right | 40 min |
| | | Total | 1 hr 20 min |

RETURN

FIG. 10

GLOVE/LOGGING SYSTEM

TECHNICAL FIELD

The present invention relates to a glove/logging system for recording and storing information on the operator name and the status of use for a work glove used in equipment such as an isolator and a glove box in a time-series manner.

BACKGROUND ART

In a work performed in a clean atmosphere such as a work at a manufacturing stage of pharmaceutical products or a work at a manufacturing stage of semiconductors or electronic components, the works are performed in a clean work environment in which an inside is kept in a dust-free/sterile state so that contaminants do not enter from an external environment. As such clean environment, clean rooms are generally used. In this clean room, a worker wearing dust-free clothes performs a work. However, in order to improve sterile guarantee standards and dust-free guarantee standards, a work is performed by constructing a more highly clean zone in the clean room.

As a method of constructing a highly clean zone, an isolator or a glove box (hereinafter collectively referred to as "isolator") is used. With this isolator, a chamber sealed from an external environment is used, and a worker performs a work from an outside of this chamber through the glove or the like. This type of isolator is particularly called as "sterile isolator".

As another method of constructing the highly clean zone, RABS (restricted-access barrier system) is used. In the RABS, a zone surrounded by wall surfaces with a lower part open is provided in a part of the clean room, and a laminar flow (hereinafter referred to as "laminar flow") of clean air in unidirectional air flow flowing from an upper side to a lower side is made to flow therein and strict access restriction is set for workers. In this RABS, a worker performs a work through a work glove or the like provided on the wall surface.

Inside the isolator or RABS for manufacturing pharmaceutical products in general, high decontamination validation conforming to GMP (Good Manufacturing Practice) is completed to guarantee grade A (Guidance on the Manufacture of Sterile Pharmaceutical Products by Ministry of Health, Labour and Welfare). In this case, the state outside the isolator or RABS is maintained at grade B, C, or D. It is thus essential that a sterile environment is maintained not only inside an isolator or RABS requiring highly sterile guarantee standards, but also in an external environment.

Meanwhile, in works for handling substances harmful to human health such as a work at a manufacturing stage of pharmaceutical products, a work for handling harmful microorganisms in the fields of medicine and biology or a work for handling radioactive substances, it is necessary to protect workers from contamination derived from chemical substances, microorganisms and the like harmful to human health, and prevent these chemical substances and microorganisms from leaking from a work environment to an external environment. Also, in these works, an isolator capable of allowing workers to perform a work from an outside of a chamber sealed from an external environment through a glove or half-suit is used. This type of isolator is particularly called as "contained isolator".

An isolator is airtightly shielded from an external environment for workers to work. The outside air is purified by a filter to be supplied into a chamber, while the air in the chamber is purified by a filter to be discharged to an outside. Accordingly, such an isolator can principally be used both as a sterile isolator and a contained isolator.

The use of an isolator, depending on a purpose thereof, can provide further safety improvement by adjusting the air pressure in a chamber. Specifically, if the purpose is to keep sterile, the pressure in a chamber is set higher than the outside air pressure (hereinafter referred to as "positive pressure"). Due to air flow from the chamber to an outside, even if air leak occurs from the chamber, entry of floating bacteria and the like from the outside to the chamber is prevented.

On the other hand, when an isolator is used as a contained isolator, the pressure in a chamber is set lower than the outside air pressure (hereinafter referred to as "negative pressure"). Therefore, due to air flow from the outside to the chamber, even if air leak occurs from the chamber, contamination of the external environment by chemical substances or the like in the chamber is avoided.

Herein, the airtightness of a work glove seems a particularly essential factor to maintain a high-level internal sterile environment at the boundary between the inside and outside of a sterile isolator or RABS. A work glove in frequent use by a worker is prone to failures such as pinholes and cracks on the main body, and its subsequent airtightness breakdown fails to maintain a high-level internal sterile environment.

Likewise, the airtightness of a work glove seems a particularly essential factor to protect workers from contamination harmful to human health derived from chemical substances, microorganisms and the like at the boundary of a contained isolator and the outside. Failures such as pinholes and cracks are generated on the main body of a work glove, and its subsequent airtightness breakdown allows chemical substances and microorganisms harmful to human health to leak into an external environment and workers to be contaminated.

It is thus preferable that the status of use for a work glove such as the frequency of use, the period of use, and the details of work be precisely recorded and the airtightness of a work glove be inspected or the glove be replaced in accordance with prescribed rules. However, a work glove is actually managed by mainly inspecting failures thereof after the elapse of a certain period of time.

For instance, each type of airtightness inspection device (generally referred to as "glove tester") is employed. Specifically, the following Patent Document 1 proposes a device for inspecting negative-pressure glove for airtightness provided with a negative-pressure chamber. The device covers a connecting member for attaching a work glove to an isolator (hereinafter referred to as "glove port") with a chamber base of the negative-pressure chamber to form a negative-pressure space between a work glove and the negative-pressure chamber. Accordingly, the device detects leakage of the air from the work glove and the attaching portion to inspect failure.

CITATION LIST

Patent Literature

Patent Document 1: JP-A-2002-280277 A

SUMMARY OF INVENTION

Technical Problem

Nevertheless, the device described in the above Patent Document 1 inspects the airtightness by checking failure of a work glove for a certain period of time, but unfortunately fails to consider the status of use for the work glove. Thus, the inspection is conducted by finding out failures one after another in accordance with prescribed rules, and ensuring the safety requires an increased frequency of inspections and the resulting increases in workload, which makes the entire inspection inefficient.

In fact, each work glove, with a certain period of elapsed time from the start of use, is replaced in accordance with prescribed rules. However, it is hard to accurately determine the actual status of use for an individual pair of work gloves before they are replaced. In reality, each work glove is managed by the request from workers. Under the circumstances, the individual pair of work gloves are prone to different loads due to a different state of use requested by each worker, improper timing of replacement, failure of requests, and difference in the details of work.

Accordingly, it is essential that the worker wearing an individual pair of work gloves is identified and the details of work and working time are accurately determined. Gaining such information allows for proper determining of when an airtightness inspection for the individual pair of work gloves should be done and the timing of glove replacement. Further, determining the frequency of use for a work glove makes it possible to accurately examine the state of occurrence of troubles with the device and the work, and take prompt safety measures.

The present invention was made in view of the situation to solve the problems, and has an object to provide a glove/logging system capable of accurately determining periods for glove airtightness inspection and replacement and improving the safety of a work glove in use and the work efficiency by recording and storing the status of use such as the operator name, the frequency of use, the period of use, and the details of work for an individual pair of work gloves attached to a device such as an isolator, and retroactively checking improper work and device abnormalities by tracing glove operations upon occurrence of operational abnormalities.

Solution to Problem

To solve the aforementioned problem, inventors of the present invention have carried out an extended investigation to find that the status of use for an individual pair of work gloves can accurately be recorded and stored by attaching RFID tags to each worker and the individual pair of work gloves, and RFID readers to a cleanroom and an isolator. Based on that information, the present invention was accomplished.

Specifically, a glove/logging system (30) according to the present invention is, according to description in claim 1, a system for configured to record and store information on the status of use for a work glove (20) attached to equipment such as an isolator (10) placed inside a cleanroom, including:
an operator tag (31) attached to each worker (A) working at the equipment; a glove tag (32) attached to the work glove attached to the equipment; a first reader device (33) including an antenna (33a) configured to read data from the operator tag and the glove tag; and an information device (34) configured to record and store the information by communicating the information with first reader device, characterized in that
the antenna is configured to define an opening (16a) of a glove port (16) dimensioned to attach the work glove to the equipment as a principal reception region (R), and the first reader device is configured to receive information from
   a) the operator tag that passes through the reception region or stops therein, or
   b) the glove tag via the antenna
   to communicate the information with the information device.

Moreover, a particular implementation of the present invention is characterized in that
the operator tag includes one or more RFID chips (31a), each attached to right and left wrists (A1) of each worker, such that the operator tag passes through inside of the principal reception region when a worker inserts an arm into the work glove or removes the arm from the work glove.

Moreover, the present invention is, according to description in claim 3, the glove/logging system according to claim 1, characterized in that
the glove tag includes one or more RFID chips, each attached to an arm portion of the work glove,
the glove tag is positioned outside the principal reception region while a worker is working with the work glove being inserted into an inside of the equipment placed inside a cleanroom, and
the glove tag is attached to a position to stop inside the reception region while the worker is not working with the work glove being taken out of the equipment placed inside a cleanroom.

Moreover, the specific embodiment may include a second reader device configured to communicate the communicating information with the information device, characterized in that
the operator tag is configured to communicate the information with the information device via the first reader device or the second reader device when a worker attaches the operator tag thereto, whereby at least one of the following operations is performed: confirming the worker or writing an identification; confirming a right arm of the worker or a left arm of the worker or writing the identification; confirming the worker to enter or leave a cleanroom; and confirming the details of work at the equipment.

Advantageous Effects of Invention

According to the above configuration, the glove/logging system according to the present invention records and stores information on the status of use for a work glove attached to an equipment such as an isolator placed inside a cleanroom. The glove/logging system includes an operator tag, a glove tag, a reader, and an information device. The operator tag is attached to each worker working at the equipment. The glove tag is attached to the work glove attached to the equipment.

The reader includes an antenna that defines an opening of a glove port for attaching the work glove to the equipment as a principal reception region. Additionally, the reader receives information from the operator tag that passes through the reception region or stops therein via the antenna or the glove tag to communicate the information with the information device. Consequently, the information from the operator tag that passes through the reception region or stops therein or the glove tag is recorded and stored in the information device.

The above configuration can record and store the status of use such as the operator name, the frequency of use, the period of use, and the details of work for an individual pair of work gloves attached to an equipment such as an isolator. Accordingly, periods for glove airtightness inspection and replacement can accurately be determined based on such information, and improvement in the safety of a work glove in use and work efficiency can be realized.

According to the above configuration, the operator tag includes one or more RFID chips. The operator tags are each attached to right and left wrists of each worker. The operator tag is attached so as to pass through the inside of the reception region of the antenna when a worker inserts an arm into the work glove or removes the arm from the work glove. Consequently, when the worker inserts the arm into the work glove or removes the arm from the work glove, worker's actions are read by the reader via the antenna to accurately record and store worker's and work information in the information device.

According to the above configuration, the glove tag includes one or more RFID chips. The glove tag is attached to an arm portion of the work glove. Herein, while a worker is working, the work glove is inserted into the inside of the equipment. Meanwhile, when the worker is not working, the work glove is taken out of the equipment. According to the above configuration, the glove tag is attached to a position outside the reception region of the antenna while the worker is working, and a position inside the reception region of the antenna where it stops when the worker isn't working. Consequently, the status of use for a work glove and worker's actions are read by the reader via the antenna, and worker's and work information are accurately recorded and stored in the information device.

According to the above configuration, the glove/logging system according to the present invention may include a second reader as required in addition to a reader for communicating information with the information device. The operator tag communicates information with the information device via the reader or the second reader when a worker attaches the operator tag thereto. In this communicating process, operations of confirming the worker or writing the identification, confirming the right or left arm of the worker or writing the identification, confirming the worker to enter or leave a cleanroom, and confirming the details of work in a recording device are performed. At least one of these operations is taken. Consequently, not only worker's and work information but also much more information can be recorded and stored.

Each of the above configurations can provide a glove/logging system capable of accurately determining periods for glove airtightness inspection and replacement and improving the safety of a work glove in use and the work efficiency by recording and storing the status of use such as the operator name, the frequency of use, the period of use, and the details of work for an individual pair of work gloves attached to an equipment such as an isolator, and retroactively checking improper work and equipment abnormalities by tracing glove operations upon occurrence of operational abnormalities.

BRIEF DESCRIPTION OF DRAWINGS

FIG. 10 is a display screen of a monitor of the glove/logging system showing a sample accumulated data image.

DESCRIPTION OF EMBODIMENTS

A glove/logging system according to the present invention will be described with reference to each embodiment. The present invention is not restricted to each of the following embodiments.

First Embodiment

Figure 1:
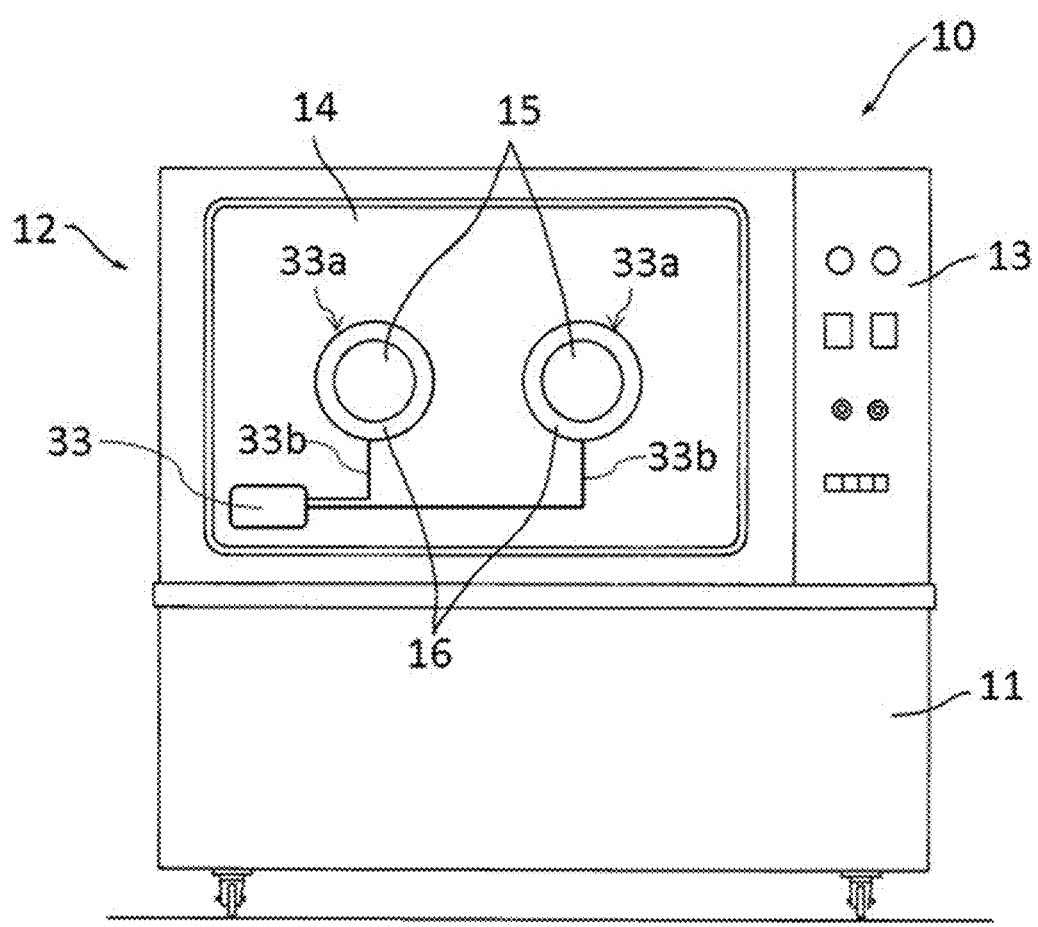
FIG. 1 is a front elevational view showing an isolator including a glove/logging system.
Figure 2:
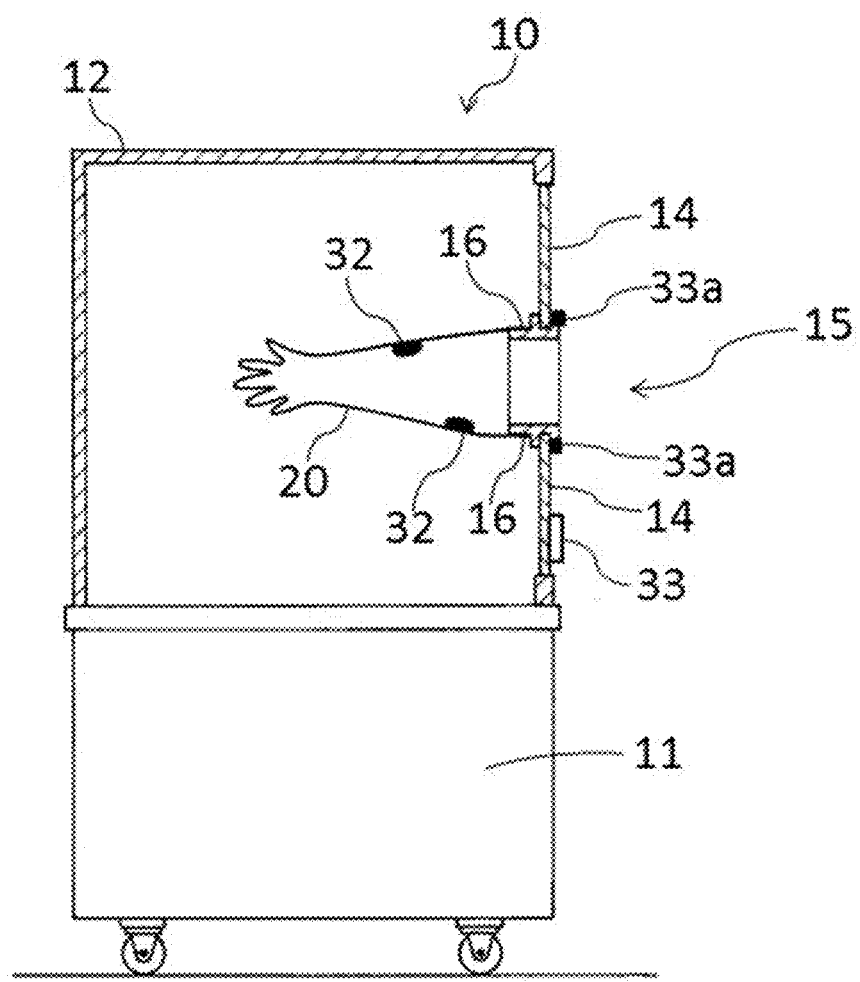
FIG. 2 is a cross-sectional left lateral view of the isolator in FIG. 1.

The first embodiment relates to a glove/logging system included in an isolator placed in a clean room. FIG. 1 is a front elevational view showing an isolator including a glove/logging system according to the first embodiment. FIG. 2 is a cross-sectional left lateral view of the isolator.

In FIGS. 1 and 2, an isolator 10 is composed of a frame 11 placed on the floor of a clean room (not shown), a chamber 12 placed on the frame 11, and a control panel 13 joined at a wall portion on the right side of the chamber 12 (see FIG. 1). The chamber 12 is composed of a housing made of stainless steel airtightly shielded from an external environment, including a filter unit for air suction and discharge (not shown) and a blower (not shown) for discharging the air inside the chamber 12 to the outside after filtering the same in a filter unit.

The chamber 12 is provided at a wall portion on the front side with a clear glass window 14 allowing for visual confirmation inside the chamber (see FIG. 1). The glass window 14 includes 2 circular operation openings 15 for connecting the outside and the inside of the chamber 12. To each of the operation openings 15 are attached a glove port (attaching frame) 16 for airtightly attaching a work glove and a work glove 20 made of a synthetic resin (see FIG. 2) attached to the glove port 16. FIG. 2 expediently shows the work glove 20 in a horizontal and enlarged manner.

Figure 3:
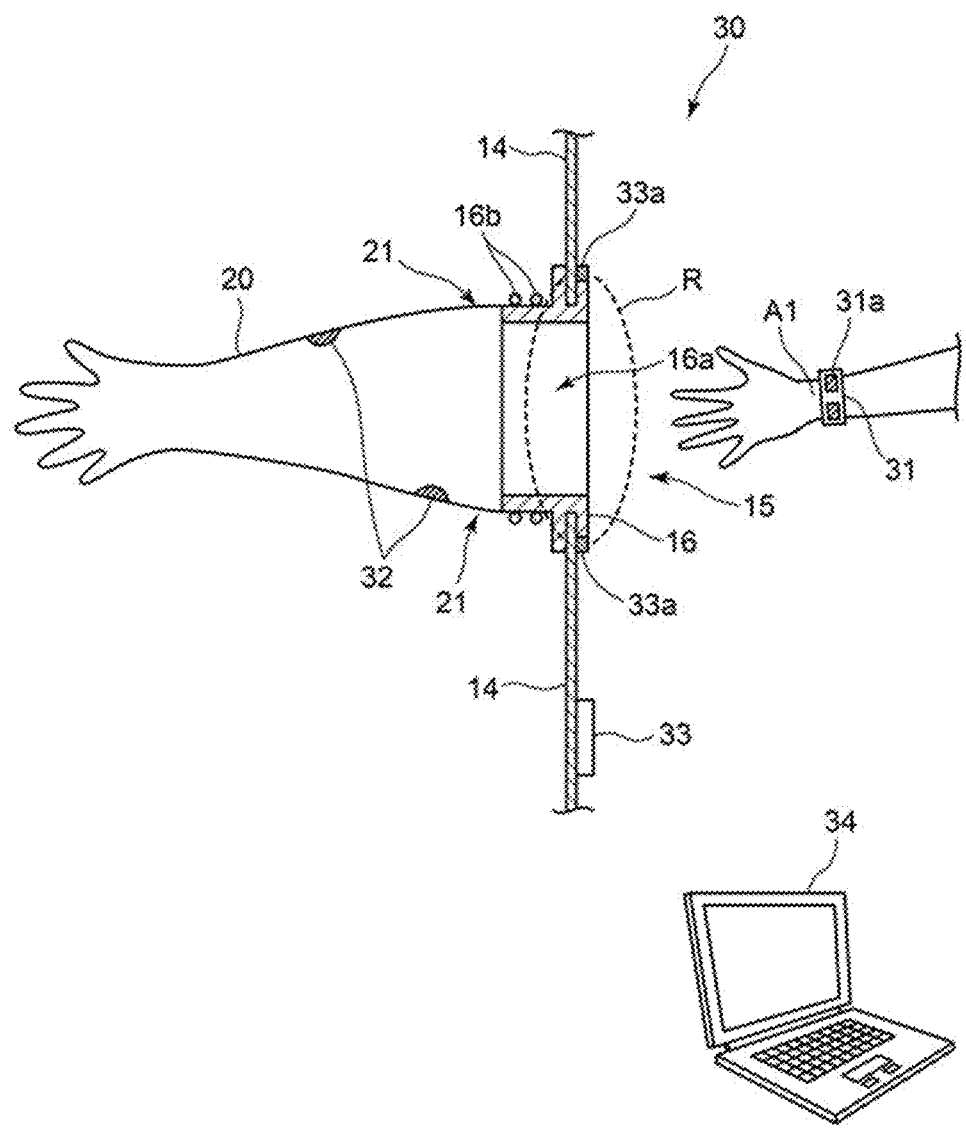
FIG. 3 is a block diagram of the glove/logging system in the state of non-communication.

Subsequently, the basic configuration of the glove/logging system 30 included in the isolator 10 will be described. FIG. 3 is a block diagram of the glove/logging system according to the first embodiment showing the state of non-communication. FIG. 3 is a cross-sectional view showing that the work glove 20 is attached to the glove port 16 attached to the operation opening 15 of the glass window 14 of the isolator 10. Specifically, the glove port 16 is inserted into the operation opening 15 and fixed to the glass window 14, and an insertion portion 16a for a worker to insert an arm is formed on the inner periphery of the glove port 16. On the other hand, a base end portion (upper arm portion) 21 of the work glove 20 attached to the glove port 16 is fixed to the outer periphery on the inner side (left side in the figure) of the chamber 12 of the glove port 16 by 2 O-rings 16b.

With the state, FIG. 3 shows the glove/logging system 30 included in the isolator 10. The glove/logging system 30 is composed of a wristband (operator tag) 31, a glove tag 32, a reader 33 for reading information from each of the tangs, and a personal computer 34 as an information device.

Figure 4:
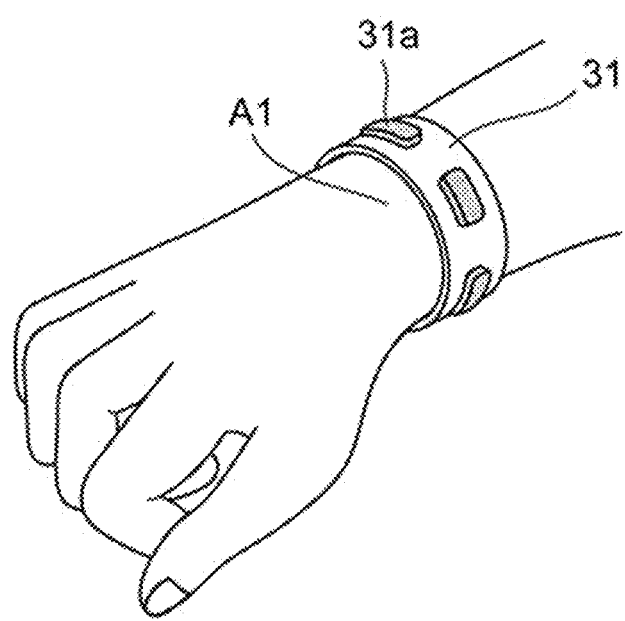
FIG. 4 is a perspective view showing that a wristband (operator tag) used in the glove/logging system in FIG. 3 is attached to a wrist.
Figure 5:
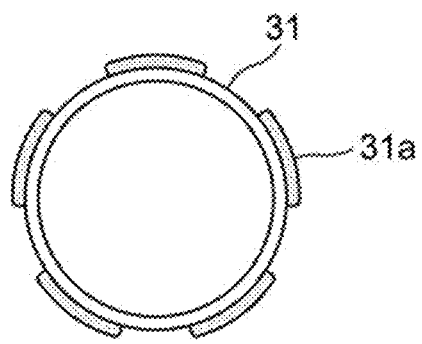
FIG. 5 is a plan view showing the wristband (operator tag) in FIG. 4.

The wristband 31 includes a plurality of RFID (radio frequency identification) chips 31a on the outer periphery. In the first embodiment, 5 RFID chips are equally spaced on the outer periphery of the wristband 31 (see FIGS. 4 and 5). The reason that a plurality of RFID chips is equally spaced on the outer periphery of the wristband 31 will be described later. The wristband 31 is attached to a wrist A1 of a worker A (not shown) (see FIGS. 3 and 4). To right and left wrists of the worker attached different wristbands 31 as operator tags to write information such that right and left hands of the worker A are identified. The details of writing information in the wristband will be described later.

The glove tag 32 includes a RFID chip in which information for identifying the attached work glove 20 is written. The glove tag 32 is attached to a portion on the inside where an arm of the work glove 20 is inserted, but a portion not on the outside where the arm is exposed to the chamber 12. This is because that an attaching portion of the glove tag 32 is configured not to affect the sterile condition maintained inside the chamber 12. In the first embodiment, 2 glove tags 32 are attached to 2 portions (see FIG. 3). One tag 32 is attached around a base end portion (upper arm portion) 21 of the work glove 20 and to a lower portion thereof. The other tag 32 is attached around the center of an arm portion of the work glove 20 and to an upper portion thereof. The reason that the glove tags 32 are attached at these positions will be described later.

The reader 33 is placed outside the glass window 14 of the isolator 10 and at a position on the lower left side (see FIG. 1). The reader 33 is provided inside with an antenna switching substrate, a reader substrate, an interface substrate, a conversion connector, a Wi-Fi conversion adapter, and a mobile battery. The reader 33 may have only a reader function (read-only), and have a reader-and-writer function (for both of reading/writing) as required. The reader 33 includes 2 loop antennas 33a for receiving information written on each of the RFID chips of the wristband 31 and the glove tag 32.

The 2 loop antennas 33a are fixed on the outer periphery of the right and left glove ports 16 (see FIGS. 1 and 2). The 2 loop antennas 33a are each connected to the reader 33 by wires 33b (see FIG. 1). In FIG. 3, it is preferable that a reception region R of each of the loop antennas 33a is exclusively near the operation opening 15 of the glove port, mainly near the insertion portion 16a for a worker to insert the arm. The size of the reception region R of the loop antenna 33a and the receiving sensitivity of the reader 33 will be described later.

The personal computer 34 (hereinafter referred to as "PC 34") is configured to communicate with the reader 33 by wireless LAN and receive information from each of the RFID chips read by the reader 33. If the reader 33 has a reader-and-writer function, the PC 34 writes information on each of the RFID chips via the reader 33. To the PC 34 are inputted beforehand information for identifying the isolator 10, information for identifying the glove tag 32 attached to the right and left work gloves 20, information for identifying each of the workers, information for identifying the right and left wristbands 31 of each of the workers, and information for identifying the state of working of each of the workers. In addition, the PC 34 includes a calculation software for accumulating workers and working time, recording the details of work, and recording and storing accumulated working time for an individual work glove 20 from such information.

Herein, the state of the worker A to work at the isolator 10 by using the glove/logging system 30 according to the first embodiment will be described. The isolator 10 includes the chamber 12 under a sterile condition of grade A, and is placed on the floor of a clean room (not shown) (see FIGS. 1 and 2). The basic configuration of the glove/logging system 30 is described as above.

In this state, the worker A working inside the clean room attaches wristbands 31 to right and left wrists. Subsequently, the worker A allows the reader 33 to read information on the right and left wristbands 31, and the PC 34 to input its ID and password. In this case, the PC 34 in communication with the reader 33 collates the inputted ID and password and stored information to identify the worker A and the right and left arms. Instead of checking the worker A and the right and left wristbands 31, the information on the worker A as an operator and the right and left arms may be inputted to the right and left wristband 31 at this stage by using the reader 33 including a reader-and-writer function (for both of reading/writing).

Subsequently, the worker A starts to work at the isolator 10. FIG. 3 is a block diagram of the glove/logging system 30 as described above showing the state of non-communication. In this state, the right and left wristbands 31 of the worker A are outside the reception region R of the loop antenna 33a included in the reader 33. Accordingly, the reader 33 neither detects the wristband 31 nor reads the information.

Figure 6:
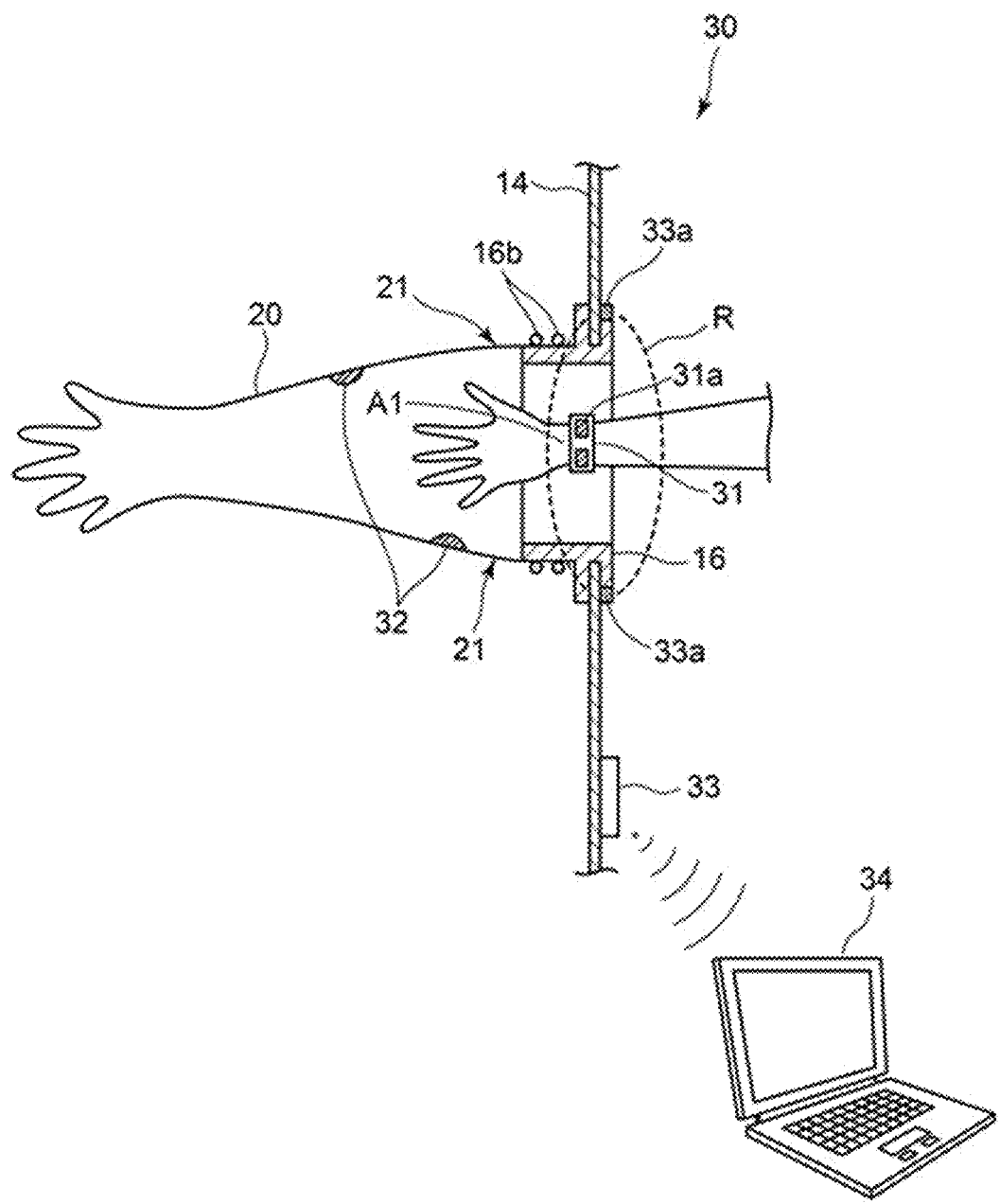
FIG. 6 is a block diagram of the glove/logging system in the state of communication.

Herein, the worker A inserts the right and left arms into the glove port 16 of the isolator 10. FIG. 6 is a block diagram of the glove/logging system showing the state of communication. In this state, the right and left wristbands 31 of the worker A are inside the reception region R of the loop antenna 33a included in the reader 33. Accordingly, the reader 33 can detect the wristband 31 and read the information. In FIG. 6, the information on the wristband 31 read by the reader 33 is transmitted to the PC 34. When the reader 33 detects a wristband 31 in which neither a worker nor right and left arms are identified, the PC 34 is set beforehand so as to give an alarm to prevent false work.

Herein, the size of the reception region R of the loop antenna 33a and the receiving sensitivity of the reader 33 will be described. As shown in FIG. 3, when the reader 33 detects the wristband 31 of the worker A as it is outside the insertion portion 16a of the glove port 16 and the state, the state of worker A's working cannot accurately be recorded. Accordingly, it is not preferable that the receiving sensitivity of the reader 33 is made higher and the reception region R of the loop antenna 33a is set wider. Even if the receiving sensitivity of the reader 33 is set lower to some extent, the reception regions R of right and left glove ports 16 are considerably overlapped, thereby falsely confirming arm's insertion into either right or left glove port 16. Thus, it is preferable that the receiving sensitivity of the reader 33 is made as low as possible to limit the reception region R of the loop antenna 33a primarily at or around the insertion portion 16a of the glove port 16.

Herein, in this regard, the reason that a plurality of RFID chips is equally spaced on the outer periphery of the wristband 31 will be described. As described above, for example, it is necessary to avoid false confirmation that the loop antenna 33a of the left glove port 16 takes a wristband 31 inserted into its adjacent right glove port 16 for that inserted into the left glove port 16. For this purpose, the reception region R of the loop antenna 33a is limited around the insertion portion 16a to make the receiving sensitivity of the reader 33 considerably low. However, too low receiving sensitivity of the reader 33, in turn, may allow the reader 33 to fail to detect the wristband 31 inserted into the left glove port 16. In particular, depending on the position of the insertion portion 16a through which the inserted arm passes (upper or lower, right or left) or the orientation of the wrist (facing the back or palm of the hand), the loop antenna 33a may not receive information from RFID chips 31a of the wristband 31. In this case, it is not possible to accurately record the state of the worker A's working.

It is thus extremely difficult to adjust the receiving sensitivity of the reader 33 and the reception region R of the loop antenna 33a. On the contrary, it is an effective means to equally space a plurality of RFID chip 31a on the outer periphery of the wristband 31. In the first embodiment, 5 RFID chips 31a are equally spaced on the outer periphery of the wristband 31 as described above (see FIGS. 4 and 5). Accordingly, when one arm e.g., a left arm is inserted into the left glove port 16, the loop antenna 33a of the left glove port 16 detects 4 RFID chips 31a of the wristband 31 on the left wrist. In this case, the loop antenna 33a of the right glove port 16 into which the left arm is not inserted detects one RFID chip 31a of the wristband 31 on the left wrist. From these results, the PC 34 in communication with the reader 33 can properly judge that the left arm is inserted into the left glove port 16.

Meanwhile, consider that non-workers wear other wristbands, walk around the isolator 10, or observe the state of a regular worker A's working. As described above, it is preferable that the receiving sensitivity of the reader 33 is made as low as possible to limit the reception region R of the loop antenna 33a primarily around the insertion portion 16a of the glove port 16. However, this measure is extremely difficult to take, and the reader 33 can falsely detect other wristbands on non-workers. In this case, since such detection is short-time and irregular, the PC 34 is programed to regard the detection as irrelevant noise.

From these observations, the PC 34 can record and store the time for the worker A to insert both of the right and left arms or either arm into the glove port 16 and then start working at the isolator 10. Similarly, the PC 34 can record and store the time for the worker A to remove both of the right and left arms or either arm from the glove port 16 and then finish working at the isolator 10. From these records, information such as worker A's working time and the accumulated working time can be recorded and stored. In addition, criteria for judging whether the work has been completed properly and smoothly or not can be provided by collating the details of work and the previous record of the worker A. Further, the accumulated working time (accumulated operating time) by a plurality of workers for each of the work gloves 20 attached to the right and left glove ports 16 can be determined.

Herein, since workers are dedicated to complicated operations at the isolator 10, they frequently insert or remove the arms even during work. Accordingly, the state of working cannot accurately be determined only by the detection of the wristband 31 by the reader 33. Then, a method for determining the accumulated working time (accumulated operating time) by a plurality of workers for each of the work gloves 20 using duplicated data from other information will be described. Each of the work gloves 20 of the isolator 10 is inserted into the inside of the chamber 12 during work. On the other hand, each of the work gloves 20 is taken out of the chamber 12 while the work is not done. Herein, whether each of the work gloves 20 is working or not is determined by the detection of a RFID chip of the glove tag 32 by the reader 33.

Figure 7:
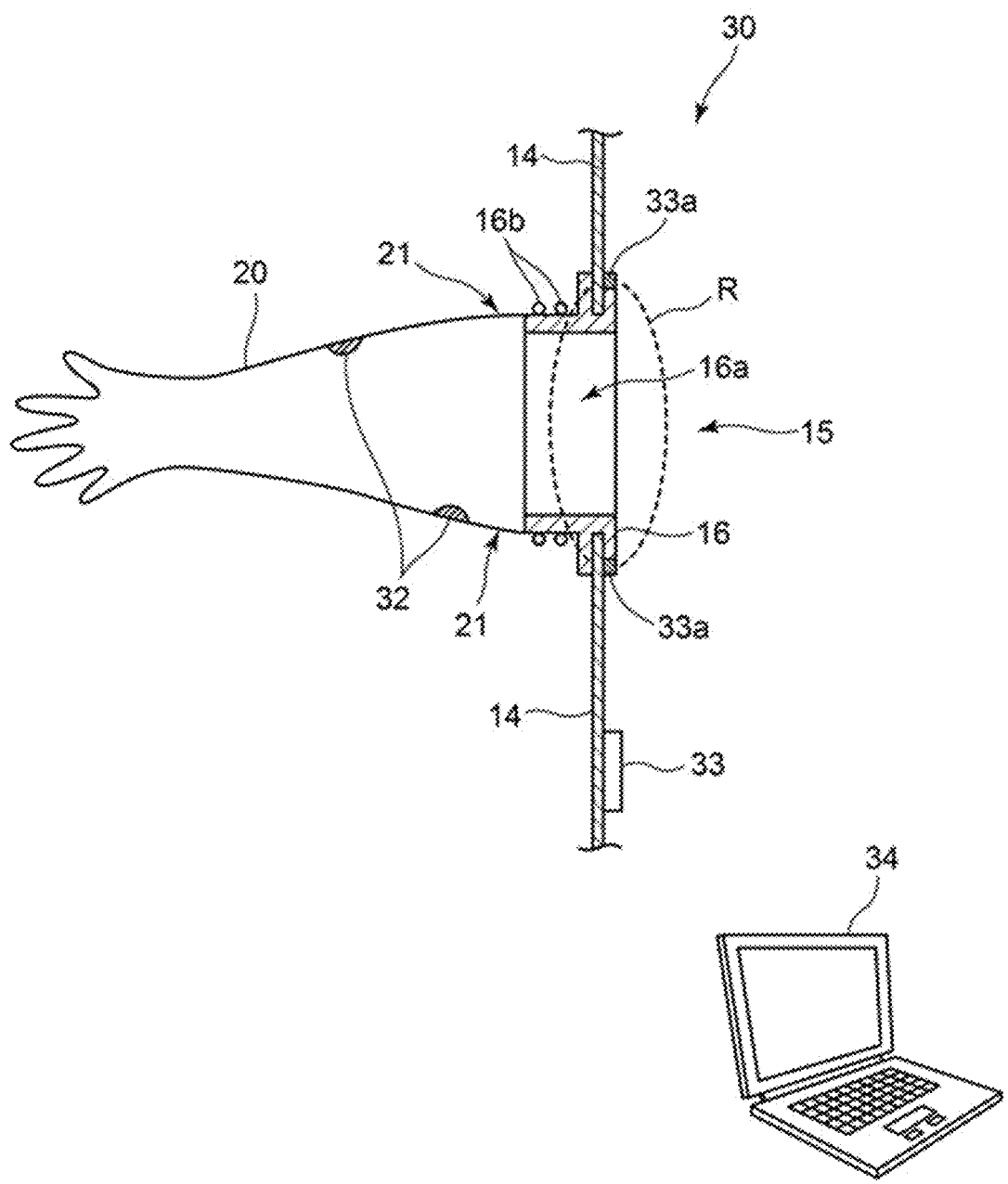
FIG. 7 is a block diagram of the glove/logging system at a position of the work glove that is working in the state of non-communication.

FIG. 7 is a block diagram of a glove/logging system at a position of a work glove that is working showing the state of non-communication. In FIG. 7, an arm of the worker A is not illustrated. In this state, the work glove 20 is inserted into the inside of the chamber 12, and 2 glove tags 32 are outside the reception region R of the loop antenna 33a included in the reader 33. Accordingly, the reader 33 neither detects the glove tag 32 nor reads the information. This state is judged as that the work glove 20 is used during work. Depending on the motion of the work glove 20 during work, the reader 33 can detect the glove tag 32. However, since the detection is extremely short-time, the PC 34 is programed not to falsely confirm that the state is not during work.

Figure 8:
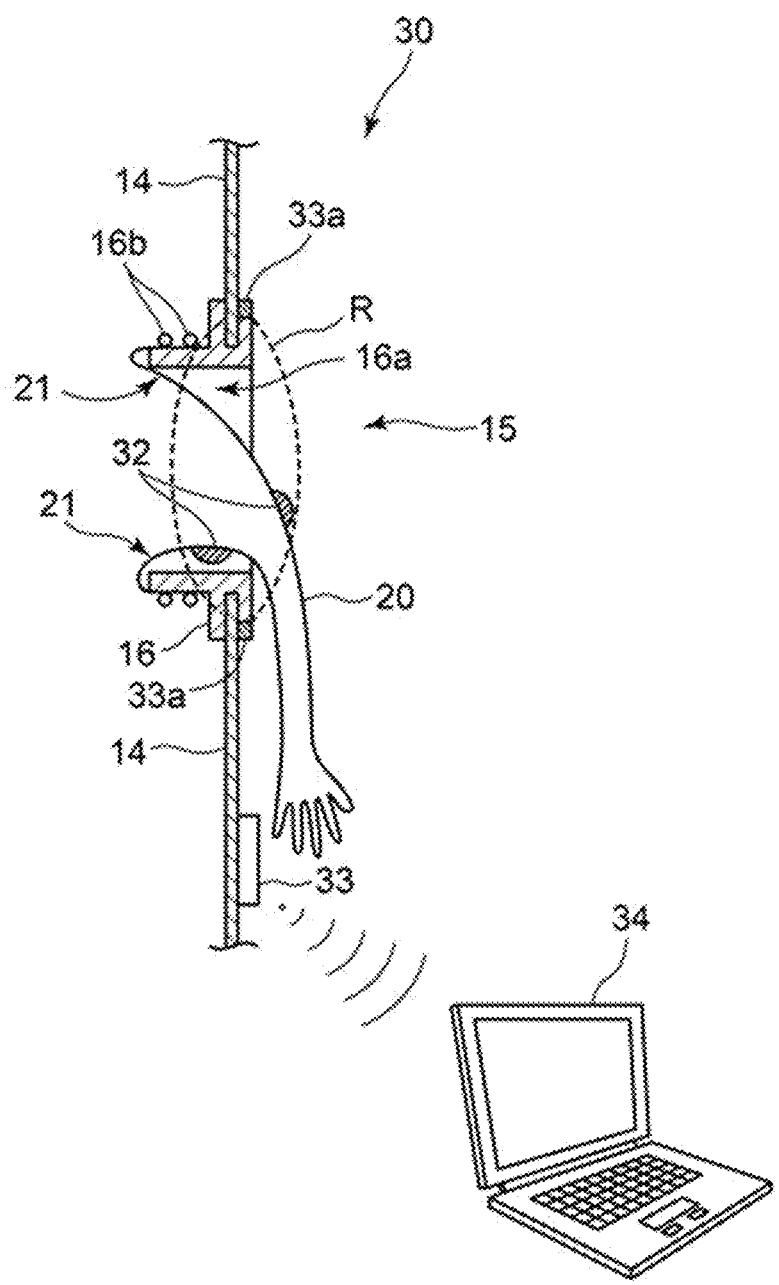
FIG. 8 is a block diagram of the glove/logging system at a position of the work glove that is not working in the state of communication.

Meanwhile, FIG. 8 is a block diagram of a glove/logging system at a position of a work glove that is not working showing the state of communication. In this state, the work glove 20 is taken out of the chamber 12, and 2 glove tags 32 are inside the reception region R of the loop antenna 33a included in the reader 33. Accordingly, the reader 33 can detect the glove tag 32 and read the information. The reader 33 transmits the information on the glove tag 32 read to the PC 34. This state is properly judged as that the work glove 20 is not working.

It is thus necessary to attach the glove tag 32 at an appropriate position to judge whether the work glove 20 is working or not. In the first embodiment, one glove tag is attached around the base end portion (upper arm portion) 21 of the work glove 20 and on the lower side as described above. The other one glove tag is attached around the center of an arm portion of the work glove 20 and on the upper side. Whether the work glove 20 is working or not can more properly be judged by attaching glove tags 32 at 2 locations. In this way, the accumulated working time (accumulated operating time) of each of the work gloves 20 can be determined. A comparison of the results collected from the glove tag 32 and the results collected from the above wristband 31 can more accurately determine each of the details of work and the state of each of the work gloves 20.

Figure 9:
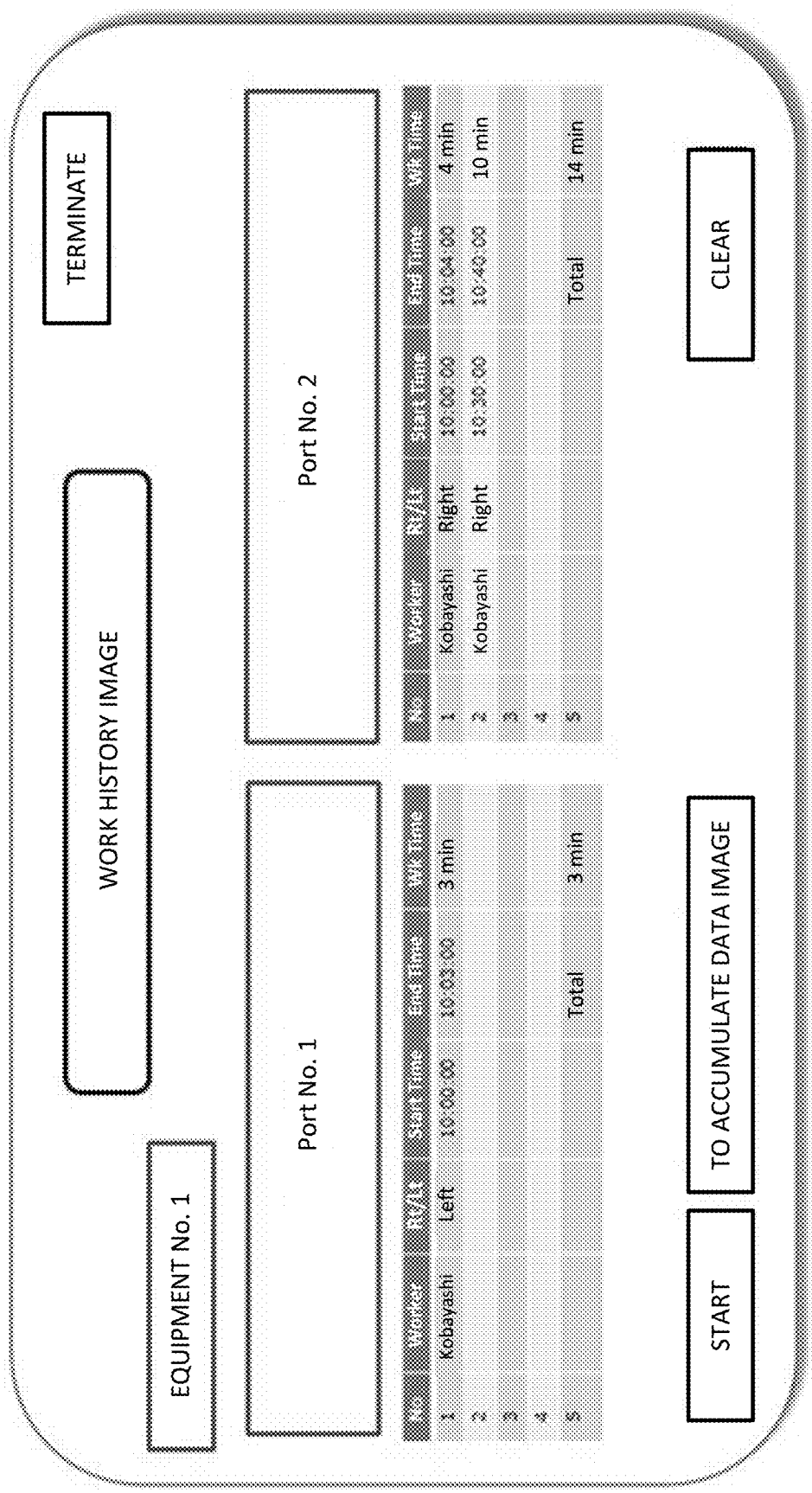
FIG. 9 is a display screen of a monitor of the glove/logging system showing a sample work history image.

The status of use for each of the work gloves 20 in the isolator 10 and the state of other works can accurately and promptly be determined in a time-series manner by displaying on the monitor the information collected in the PC 34 and the previous results recorded and stored. FIG. 9 is a display screen of a monitor of the glove/logging system, and a sample work history image. FIG. 9 clearly shows the name of each worker, work start time, work termination time, and working time for port No: 1 (left glove port) and port No: 2 (right glove port) of equipment No: 1 (isolator).

On the other hand, FIG. 10 is a display screen of a monitor of the glove/logging system, and a sample accumulated data image. FIG. 10 clearly shows the accumulated working time for port No: 1 (left glove port) and port No: 2 (right glove port) of equipment No: 1 (isolator) for accumulation by equipment/port. In addition, FIG. 10 clearly shows the working time of right and left arms for each worker for accumulation by worker.

Second Embodiment

Subsequently, the state of a worker A to work at an isolator 10 by using a glove/logging system 30 according to a second embodiment will be described. In the second embodiment, as in the above-described first embodiment, the isolator 10 includes a chamber 12 under a sterile condition of grade A, and is placed on the floor of a clean room (not shown) (see FIGS. 1 and 2). The basic configuration of the glove/logging system 30 is the same as in the above-described first embodiment, and the second embodiment includes additional components. Specifically, in addition to the reader 33 (read-only) placed outside the glass window 14 of the isolator 10, a second reader (not shown) including a reader-and-writer function (for both of reading/writing) is placed outside a door of the clean room.

In this state, a worker A outside the clean room attaches individual wristbands 31 to right and left wrists. Subsequently, the worker A allows the second reader to read information on the right and left wristbands 31, and the PC 34 to input its ID and password. In this case, the PC 34 in communication with the second reader collates the inputted ID and password and the stored information to identify the worker A and the right and left arms. Instead of checking the worker A and the right and left wristbands 31, the information on the worker A as an operator and right and left arms may be inputted to the right and left wristbands 31 at this stage.

Thus, the door of the clean room will be opened and the time for the worker A to enter the room will be recorded in the PC 34 by checking the worker A and the right and left wristbands 31. When the worker A performs the same operation as he/she leaves the room, the time for the worker A to leave the clean room and the duration to stay there will be recorded in the PC 34.

Subsequently, the worker A who has entered the clean room starts working at the isolator 10. The operation from the start to finish of the work at the isolator 10 in the second embodiment is the same as in the above-described first embodiment, and it is not described herein.

As described above, the present invention can provide a glove/logging system capable of accurately determining periods for glove airtightness inspection and replacement and improving the safety of a work glove in use and the work efficiency by recording and storing the status of use such as the operator name, the frequency of use, the period of use, and the details of work for an individual pair of work gloves attached to an equipment such as an isolator, and retroactively checking improper work and equipment abnormalities by tracing glove operations upon occurrence of operational abnormalities.

The present invention is not restricted to each of the above embodiments, but the following various modifications may be employed.

(1) In each of the above embodiments, an operator tag is a wristband attached to the wrist of a worker, but it is not restricted thereto, and a sticking seal or the like may be used. The attaching position may be at not only a wrist, but also other portions such as the back of the hand.

(2) In each of the above embodiments, glove tags are attached to 2 upper and lower base end portions (upper arm portion) of a work glove, but are not restricted thereto, and may be attached to one of them or 3 or more locations, or different locations. Even in this case, the attaching position is determined such that a glove tag is outside a reception region of a reader during work and a glove tag is inside a reception region of a reader while the work glove is not working.

(3) In each of the above embodiments, a reader includes a loop antenna, but it is not restricted thereto, and other antennas such as an antenna box may be employed.

(4) In each of the above embodiments, a reader and an information device are communicated by wireless LAN, but it is not restricted thereto, and may be wire transmission.

(5) Each of the above embodiments relates to a work glove attached to an isolator, but it is not restricted thereto, and it may relate to a work glove attached to a glove box or an RABS.

(6) In each of the above embodiments, a reader is placed outside a glass window of an isolator and on the lower left side, but it is not restricted thereto, and may be placed at any position so long as the work is not hampered.

REFERENCE SIGNS LIST

10 . . . Isolator, 11 . . . Frame, 12 . . . Chamber, 13 . . . Control panel, 14 . . . Glass window, 15 . . . Operation opening, 16 . . . Glove port, 16a . . . Insertion portion, 16b . . . O-ring, 20 . . . Work glove, 21 . . . Base end portion (upper arm portion),
30 . . . Glove/logging system, 31 . . . Wristband (operator tag),
31a . . . RFID chip, 32 . . . Glove tag, 33 . . . Reader, 33a . . . Loop antenna, 33b . . . Wire, 34 . . . Personal computer (PC), A . . . Reader, A1 . . . Wrist, R . . . Reception region.

The invention claimed is:

1. A glove/logging system configured to record and store information on the status of use for a work glove attached to equipment placed inside a cleanroom, the system comprising:
   an operator tag configured to be attached to a user of the system working at the equipment;
   a glove tag attached to the work glove that is attached to the equipment;
   a first reader device including a loop antenna configured to read data from the operator tag and the glove tag; and
   an information device configured to record and store the information by communicating the information with the first reader device, wherein:
   the loop antenna is disposed circumferentially about an opening of a glove port dimensioned to attach the work glove to the equipment as a principal reception region, and
   the first reader device is configured to receive the information from
      a) the operator tag that passes through the reception region or stops therein, and
      b) the glove tag via the loop antenna to communicate the information with the information device.

2. The glove/logging system according to claim 1, wherein
   the operator tag is configured to include one or more RFID chips that, in operation of the system, are attached to a right wrist and/or a left wrist of the user of the system to identify that the operator tag passes through inside of the principal reception region when the user inserts an arm into the work glove or removes the arm from the work glove.

3. The glove/logging system according to claim 1, wherein:
   the glove tag includes one or more RFID chips, each affixed to an arm portion of the work glove,
   the glove tag is positioned outside the principal reception region while the user is working with the work glove that is inserted into an inside of the equipment placed inside the cleanroom, and
   the glove tag is attached to a location of the arm portion configured to reside inside the reception region while the user is not working with the work glove that is taken out of the equipment placed inside the cleanroom.

4. The glove/logging system according to claim 1, comprising:
a second reader device configured to communicate the information with the information device, wherein:
the operator tag is configured to communicate the information with the information device via the first reader device and/or the second reader device when the user attaches the operator tag thereto, whereby at least one of the following operations is performed:
confirming the user or writing an identification;
confirming a right arm of the user and/or a left arm of the user and/or writing the identification;
confirming the user to enter or leave the cleanroom; and
confirming details of work at the equipment placed inside the cleanroom.

5. The glove/logging system according to claim 1, wherein the system further comprises an auxiliary work glove, an auxiliary opening of an auxiliary glove port, and an auxiliary loop antenna that is disposed circumferentially about the auxiliary opening, the auxiliary glove port being dimensioned to attach the auxiliary work glove to the equipment, and
wherein the operator tag is configured to include multiple RFID that are configured to be spaced around and attached equidistantly from one another circumferentially to each of right and left wrists of the user to differentiate, in operation of the system by the user, which of the work glove and the auxiliary work glove is being operated based on signals generated by the loop antenna and the auxiliary loop antenna.

6. A glove/logging system configured to record and store information on the status of use for a work glove attached to equipment placed inside a cleanroom, the system comprising:

an operator tag configured to be attached to a of the system working at the equipment;
a glove tag attached to the work glove attached to the equipment;
a first reader device including an antenna configured to read data from the operator tag and the glove tag; and
an information device configured to record and store the information by communicating the information with the first reader device, wherein
the antenna is configured to define an opening of a glove port dimensioned to attach the work glove to the equipment as a principal reception region, and
the first reader device is configured to receive the information from
a) the operator tag that passes through the reception region or stops therein, or
b) the glove tag via the antenna,
to communicate the information with the information device,
wherein the glove tag includes one or more RFID chips, each affixed to an arm portion of the work glove,
the glove tag is positioned outside the principal reception region while a is working with the work glove being inserted into an inside of the equipment placed inside the cleanroom, and
the glove tag is attached to a position to stop inside the reception region while the is not working with the work glove being taken out of the equipment placed inside the cleanroom.

* * * * *